United States Patent [19]
Fujii et al.

[11] Patent Number: 5,536,454
[45] Date of Patent: Jul. 16, 1996

[54] APPARATUS FOR GAS-LIQUID CONTACT

[75] Inventors: Masumi Fujii; Yoshitsugu Hotta; Taiichiro Suda; Kouichi Kitamura; Yukihiro Jinno; Tomio Mimura; Shigeru Shimojo; Masami Kawasaki; Kunihiko Yoshida, all of Osaka; Mutsunori Karasaki; Masaki Iijima, both of Tokyo; Shigeaki Mitsuoka, Hiroshima, all of Japan

[73] Assignees: Mitsubishi Jukogyo Kabushiki Kaisha; Kansai Electric Power Co., Inc., both of Japan

[21] Appl. No.: 462,054

[22] Filed: Jun. 5, 1995

Related U.S. Application Data

[63] Continuation of Ser. No. 178,025, Jan. 6, 1994, abandoned.

[30]  Foreign Application Priority Data

| Jan. 13, 1993 | [JP] | Japan | 5-004097 |
| Jan. 13, 1993 | [JP] | Japan | 5-004098 |
| Mar. 19, 1993 | [JP] | Japan | 5-059844 |
| Mar. 19, 1993 | [JP] | Japan | 5-059845 |

[51] Int. Cl.⁶ .................................................. B01F 3/04
[52] U.S. Cl. ........................ 261/97; 261/112.1; 261/112.2; 261/DIG. 72
[58] Field of Search ................... 261/97, 112.1, 261/112.2, DIG. 72

[56]  References Cited

U.S. PATENT DOCUMENTS

| 1,291,833 | 1/1919 | Godward | 261/DIG. 39 |
| 2,253,261 | 8/1941 | Bacon | 261/DIG. 72 |
| 2,665,123 | 1/1954 | Foster et al. | 261/DIG. 11 |
| 2,783,982 | 3/1957 | Kahl | 261/DIG. 72 |
| 2,911,056 | 11/1959 | Edel | 261/112.1 |
| 2,917,292 | 12/1959 | Hittrich | 261/112.1 |
| 3,101,382 | 8/1963 | Lyons et al. | 261/97 |
| 3,150,211 | 9/1964 | Murray et al. | 261/112.2 |
| 3,155,153 | 11/1964 | Axelsson | 261/112.2 |
| 3,316,064 | 4/1967 | Kuzuoka et al. | 261/112.2 |
| 3,353,799 | 11/1967 | Lions et al. | 261/112.2 |
| 3,466,151 | 9/1969 | Sicard et al. | 261/112.2 |
| 3,502,445 | 3/1970 | Ballard et al. | 261/97 |
| 3,523,762 | 8/1970 | Broughton | 261/97 |
| 3,595,626 | 7/1971 | Sowards | 261/DIG. 72 |
| 3,723,072 | 3/1973 | Carson et al. | 261/97 |
| 3,743,256 | 7/1973 | Oplatka | 261/DIG. 72 |
| 3,785,620 | 1/1974 | Huber | 261/DIG. 72 |
| 4,382,046 | 5/1983 | Frohwork | 261/DIG. 72 |
| 4,981,621 | 1/1991 | Pluss | 261/112.2 |
| 5,225,116 | 7/1993 | Menzel et al. | 261/DIG. 72 |

FOREIGN PATENT DOCUMENTS

| 232393 | 1/1986 | Denmark . | |
| 0267961 | 5/1988 | European Pat. Off. . | |
| 0270050 | 6/1988 | European Pat. Off. . | |
| 4-271809 | 9/1992 | Japan | 53/18 |

*Primary Examiner*—Tim R. Miles
*Attorney, Agent, or Firm*—Arnold, White & Durkee

[57]  ABSTRACT

An apparatus for gas-liquid contact in which tubular structure fillers having a cross section of any of various shapes and having straight tubular portions are arranged in a substantially vertical direction in the form of plural steps so that the gas-liquid contact surfaces of the fillers may be parallel with the flow of the gas, the apparatus for gas-liquid contact being characterized in that the gas-liquid contact surfaces comprise rough surface portions, porous surface portions, meshes or plates to which meshes adhere, or there is interposed, between the plural steps of the fillers, a dispersing plate for receiving the liquid downward coming from the site above the fillers, dispersing the liquid, and allowing the liquid to downward flow.

6 Claims, 13 Drawing Sheets

APPARATUS FOR GAS-LIQUID CONTACT

This application is a continuation of application Ser. No. 08/178,025, filed Jan. 6, 1994, now abandoned.

FIELD OF THE INVENTION AND RELATED STATEMENT

The present invention relates to an apparatus for gas-liquid contact, particularly to an apparatus for gas-liquid contact capable of efficiently bringing a gas into contact with a liquid like a $CO_2$ gas absorption device for removing a $CO_2$ gas from an exhaust gas by bringing the $CO_2$ gas contained in the exhaust gas into contact with a $CO_2$ gas absorbing liquid.

In recent years, a greenhouse effect due to $CO_2$ has been pointed out as one of the causes of a global atmosphere warming phenomenon, and it has been internationally required to urgently take measures for the greenhouse effect in order to protect a global atmospheric environment. The generation source of $CO_2$ lies in every human activity field in which a fossil fuel is burnt, and the exhaust control of $CO_2$ tends to be further strengthened in future. As one of the measures for the exhaust control, for power generation facilities of thermal power plants in which a large amount of the fossil fuel is used, there have been energetically researched a method for removing and collecting $CO_2$ from the combustion exhaust gas of a boiler, and a method for storing $CO_2$ without discharging it to the atmosphere.

On the other hand, in a gas-liquid contact technique which is employed in an absorption process of a chemical plant, a bubble cap plate tower and a packed tower have been used so that the gas-liquid contact may be achieved as much as possible. As the filler of the latter, Raschig rings having various shapes have been used.

In the apparatus for the gas-liquid contact for absorbing $CO_2$ in the combustion exhaust gas, it is necessary to efficiently treat a large amount of the gas in a short time. Therefore, an apparatus for gas-liquid contact is desired in which expansion, contraction and collision of a gas flow are not in a gas passage, no eddy occurs, and unnecessary pressure loss due to the above factors hardly takes place. Moreover, an apparatus for gas-liquid contact is desired which is constituted as simply as possible and by which a gas-liquid contact area and a contact time can be increased to resultingly heighten a contact efficiency.

As the $CO_2$ gas absorption device for removing $CO_2$ from the combustion exhaust gas, the present inventors have previously suggested a $CO_2$ gas absorption device in which many fillers are arranged so that the gas-liquid contact surfaces of the fillers may be parallel with a gas flow and they comprise tubular structures whose cross section has any of various shapes and whose tubular portions are straight, as shown in FIG. 1 (which shows the whole constitutional view of the $CO_2$ gas absorption device which will also be used in an embodiment of the apparatus for gas-liquid contact of the present invention) (refer to Japanese Patent Application Provisional Publication No. 4-271809 or No. 271809/1992). That is, in FIG. 1, reference numeral 1 is a $CO_2$ gas absorption device, and numerals 2, 2 are fillers comprising tubular structures whose tubular portion is straight, and these fillers are arranged in the form of plural steps in a substantially vertical direction. Reference numeral 3 is a line for transporting a $CO_2$ absorbing liquid, numeral 4 is a liquid dispersing nozzle, 5 is a storage space of the absorbing liquid in which $CO_2$ is absorbed, 6 is a combustion exhaust gas containing $CO_2$, and 7 is a clean exhaust gas from which $CO_2$ is removed.

As described above, any of the various shapes can be employed as the cross section of the fillers 2 comprising the tubular structures, and this cross section may be constituted of one or a combination of these shapes. In the fillers 2 comprising the tubular structures, the flow of the gas is parallel with the absorbing surface (the gas-liquid contact surface). Thus, in the gas flow path, the expansion, contraction and collision of the gas flow are not present, and no eddy occurs, so that the unnecessary pressure loss due to these factors is very small. In this case, the absorbing liquid is held by the absorbing surfaces of the fillers 2 comprising the tubular structures, and the held absorbing liquid is brought into contact with the gas flow to absorb $CO_2$, while flows downward along the surfaces. Therefore, according to this constitution, the pressure loss can be remarkably decreased, in contrast to fillers such as conventional Raschig rings.

However, the above-mentioned $CO_2$ gas absorption device has the following problems.

(a) When the absorbing surfaces of the tubular structures which are the fillers are smoothly mirror-finished, the absorbing liquid flows downward along the absorbing surfaces of the tubular structures in the form of a string owing to surface tension or cohesive force, so that it does not expand all over the absorbing surfaces and so a wet area decreases. In consequence, the gas-liquid contact area tends to decrease and the $CO_2$ absorption efficiency also tends to deteriorate inconveniently.

(b) The unit length of each tubular structure filler in the gas flow direction is restricted in view of manufacture. Therefore, if the fillers having a length of, for example, about 20 m are filled, it is necessary to pile up the tubular structure fillers up to about 20 steps. In this case, a gap is formed between each pair of the tubular structures. When the absorbing liquid flows from upper tubular structures to lower tubular structures, its flow takes the form of a string owing to the above-mentioned gap, so that its dispersibility is impaired. In order to decrease this gap, a high processing precision is required, which leads to the increase of cost.

(c) The $CO_2$ gas absorption device has some points to be improved, in the case that the gas-liquid contact surfaces on the inner walls of the tubular structures which are the fillers are mirror-finished. That is, the absorbing liquid flows downward along the gas-liquid contact surfaces of the tubular structures in the form of a string owing to surface tension or cohesive force without expanding all over the inner walls, so that the wet area (the gas-liquid contact area) decreases, and the residence time of the downward flowing liquid on the gas-liquid contact surfaces is also short. In consequence, the $CO_2$ absorption efficiency is not necessarily satisfied.

(d) As another example of the horizontal section of the tubular structure fillers, there is a section in which many wavy crests (or troughs) and the straight portions come in contact with each other.

As described above, the fillers of the $CO_2$ gas absorption device have the shown horizontal section of the tubular structures in which lattices or the above-mentioned wavy crests (or troughs) and the straight portions come in contact with each other, and according to these fillers, the effect of the gas-liquid contact efficiency is present to some extent, but some points to be improved also remain. That is, the absorbing liquid which is fed to the tubular structure from the liquid dispersing nozzle 4 and which flows downward along the gas-liquid contact surfaces hardly expands all over the inner walls due to surface tension or cohesive force, so that the absorbing liquid is liable to collect at the four corners of the lattices and at corners formed by the wavy crests and the straight lines. In consequence, the wet area (the gas-liquid contact area) decreases, and the residence time of the downward flowing absorbing liquid on the gas-liquid contact surfaces is also short. Thus, it is desired to further improve the $CO_2$ absorption efficiency.

OBJECT AND SUMMARY OF THE INVENTION

In view of the above-mentioned situations, the present invention has been intended.

One object of the present invention is to provide an apparatus for gas-liquid contact capable of solving the above-mentioned problem (a) and improving a gas-liquid contact efficiency by increasing a contact area per unit area of the gas-liquid contact surfaces of tubular structure fillers.

A further object of the present invention is to provide an apparatus for gas-liquid contact capable of solving the above-mentioned problem (b) and improving dispersibility during the downward flow of an absorbing liquid from upper step to lower step of the tubular structure fillers.

A still further object of the present invention is to provide an apparatus for gas-liquid contact capable of solving the above-mentioned problem (c) by the use of a specific material for the gas-liquid contact surfaces of the tubular structure fillers.

Another object of the present invention is to provide an apparatus for gas-liquid contact capable of solving the above-mentioned problem (d) by forming the horizontal section of the tubular structure fillers into a specific shape.

The constitutions of the present invention for achieving the above-mentioned objects are characterized by the following items (1) to (12) in an apparatus for gas-liquid contact in which tubular structure fillers having a cross section of any of various shapes and having straight tubular portions are arranged (in the apparatus) in a substantially vertical direction in the form of plural steps so that the gas-liquid contact surfaces of the fillers may be parallel with the flow of the gas, whereby the gas is brought into contact with the liquid by feeding the liquid from a site above the fillers, allowing the liquid to flow downward along the filler surfaces, and feeding the gas from a site under the fillers.

(1) It is characterized that the gas-liquid contact surfaces of the fillers comprise rough surface portions having a center line average height of 50 μm or more.

The center line average height referred to in this specification is defined as a value of micrometers (μm) obtained by the following equation, as standardized in Japanese Industrial Standard JIS B 0601-1982, in the case that a portion of a measurement length l is sampled in the direction of the center line from a roughness curve, the center line of the sampled portion is an X axis, the direction of longitudinal magnification is a Y axis, and the roughness curve is y=f(x):

$$\text{Center line average height } (Ra) = \frac{1}{l} \int_0^l |f(x)| dx$$

(2) It is characterized that the gas-liquid contact surfaces of the fillers comprise porous surface portions having a plurality of orifices.

(3) It is characterized that the fillers comprise meshes.

(4) The apparatus for gas-liquid contact of the above-mentioned item (1), (2) or (3) is characterized in that the gas is a combustion exhaust gas and the liquid is a $CO_2$ absorbing liquid.

The function of the present invention makes it possible to increase the gas-liquid contact area of the tubular structures of the fillers arranged in the apparatus for gas-liquid contact and to remarkably improve the gas-liquid contact efficiency.

As described above, according to the present invention, the gas-liquid contact surfaces of the tubular structures are roughly formed, or the tubular structures are made of the porous plates or the meshes, so that the gas-liquid contact area of the tubular structures can be increased and the gas-liquid contact efficiency can be largely improved.

(5) The apparatus for gas-liquid contact is characterized in that the plural steps of the fillers are separated from each other, and there is interposed, between the steps, a dispersing plate for receiving the liquid downward coming from the upper site of the fillers, dispersing the liquid, and allowing the liquid to downward flow.

(6) In the apparatus for gas-liquid contact of the item (5), it is characterized that the dispersing plate has a mesh portion.

(7) In the apparatus for gas-liquid contact of the item (5), it is characterized that the dispersing plate has a porous surface portion with a plurality of orifices.

(8) In the apparatus for gas-liquid contact of the item (5), it is characterized that the gas is a combustion exhaust gas and the liquid is a $CO_2$ absorbing liquid.

According to the function of the present invention, the liquid which flows downward from the upper tubular structure is dispersed by the dispersing plate and then fed to the lower tubular structure. Therefore, it is possible to substantially largely increase the gas-liquid contact area of the tubular structures and to remarkably improve the gas-liquid contact efficiency.

As described above, according to the present invention, the dispersing plate is interposed between the tubular structures, so that the liquid downward coming from the upper tubular structure can be dispersed and then fed to the lower tubular structure. Therefore, it is possible to increase the gas-liquid contact area of the tubular structure and to largely improve the gas-liquid contact efficiency. Moreover, because a high precision is not required in manufacturing the respective tubular structures, it is possible to decrease a manufacturing cost.

(9) In the apparatuses for gas-liquid contact, it is characterized that the gas-liquid contact surfaces of the fillers are made of a material in which a mesh adheres to the surface of a plate.

(10) In the apparatus for gas-liquid contact of the item (9), it is characterized that the gas is a combustion exhaust gas and the liquid is a $CO_2$ absorbing liquid.

The present invention makes it possible to increase the gas-liquid contact area of the inner walls of the fillers arranged in the apparatus for gas-liquid contact, to prolong the residence time of the downward flowing liquid, and to largely improve the gas-liquid contact efficiency.

As described above, according to the present invention, the liquid does not flow downward in the form of a string along the gas-liquid contact surface but it widely expands on the contact surface, so that the residence time of the downward flowing liquid can be prolonged, and in consequence, the gas-liquid contact efficiency can be improved.

(11) In the apparatus for gas-liquid contact, it is characterized that the horizontal section of the fillers has a shape selected from the group consisting of a circle (A), a circular arc or a continuous combination of circular arcs (B) and straight lines which do not mutually intersect or contact (C).

(12) In the apparatus for gas-liquid contact of the item (11), it is characterized that the gas is a combustion exhaust gas and the liquid is a $CO_2$ absorbing liquid.

According to the present invention, the gas-liquid contact area on the inner walls of the fillers arranged in the apparatus for gas-liquid contact can be increased, and the residence time of the downward flowing liquid can be prolonged, whereby the gas-liquid contact efficiency can be remarkably improved.

In addition, according to the present invention, the liquid does not flow downward along the gas-liquid contact surface in the form of a string, but it widely expands on the contact surface, so that the residence time of the downward flowing liquid is prolonged and consequently the gas-liquid contact efficiency can be noticeably improved.

DETAILED DESCRIPTION OF PREFERRED EMBODIMENTS

Now, suitable embodiments of the present invention will be exemplarily described in detail in reference to drawings.

First Embodiment

Figure 1:
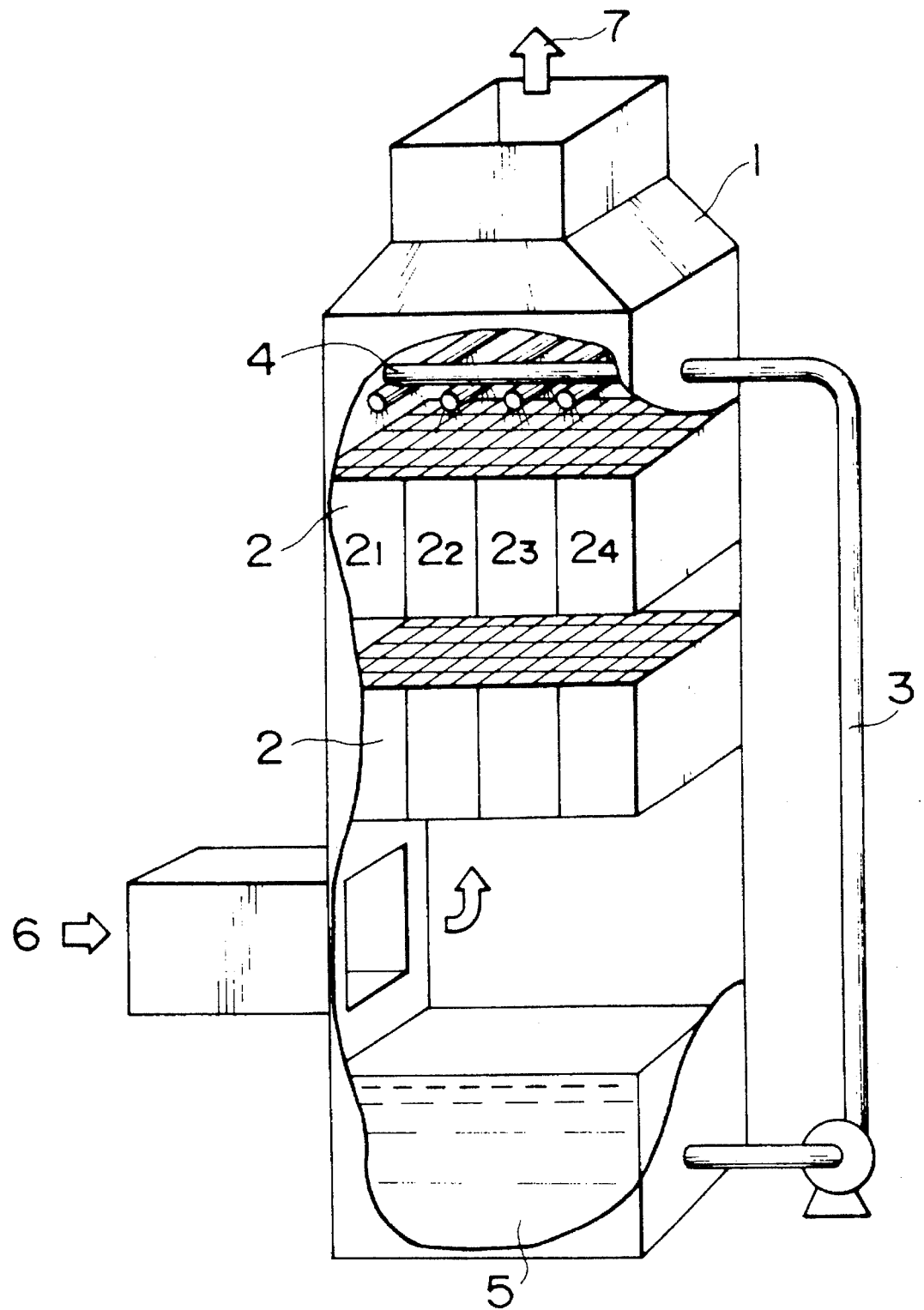
FIG. 1 is a whole perspective view showing a $CO_2$ gas absorption device for use in an embodiment of the present invention and its related $CO_2$ gas absorption device.

As the first embodiment of an apparatus for gas-liquid contact of the present invention, reference will be made to a $CO_2$ gas absorption device for removing $CO_2$ from a combustion exhaust gas by bringing the combustion exhaust gas containing $CO_2$ into-contact with a $CO_2$ absorbing liquid, in reference to FIGS. 1 to 9. In FIG. 1, tubular structure fillers 2 are vertically arranged in the form of plural steps in a $CO_2$ absorption device body 1, and these fillers have an optional shape in a horizontal section and have straight tubular portions.

In FIG. 1, the horizontal section of the tubular structure fillers 2 shows the shape of lattice. The apparatus body 1 is equipped with a $CO_2$ absorbing liquid transport line 3 for connecting a liquid dispersing nozzle 4 in the top of the body 1 to an absorbing liquid storage space 5 on the bottom of the body 1. An absorbing liquid reproduction process (not shown) for removing $CO_2$ from the absorbing liquid to improve the absorbing capacity may be provided in the middle of the transport line 3. The liquid dispersing nozzle 4 is installed so as to disperse the $CO_2$ absorbing liquid delivered through the transport line 3 to the fillers 2 as uniformly as possible. On the bottom of the apparatus body 1, there is provided an absorbing liquid storage space 5 for storing the $CO_2$ absorbing liquid which absorbs $CO_2$ while the liquid is downward flowing through the fillers 2. An opening, through which a combustion exhaust gas 6 containing $CO_2$ is introduced into the apparatus body 1, is formed on a side of the lower portion of the apparatus body 1. At the top of the apparatus body 1, there is formed an opening through which a clean exhaust gas 7 is discharged to the outside, and this clean exhaust gas 7 is obtained by removing $CO_2$ from the combustion exhaust gas with the $CO_2$ absorbing liquid while the gas flows upward through the fillers 2.

Figure 2:
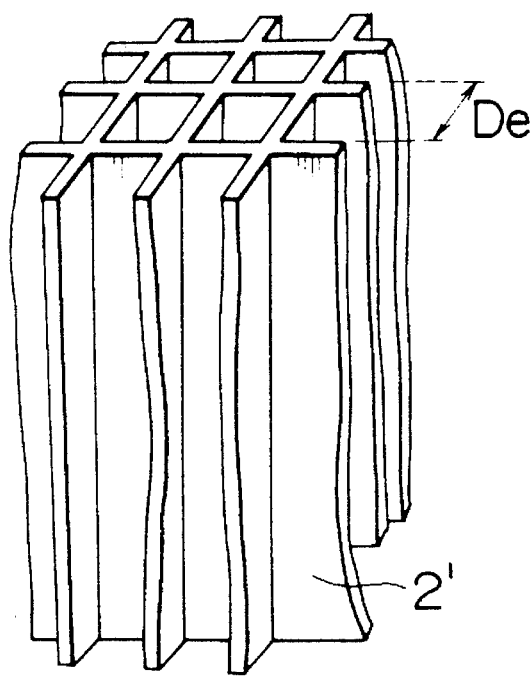
FIG. 2 is a perspective view showing a tubular structure arranged in the $CO_2$ gas absorption device.

FIG. 2 shows an enlarged partial view of the tubular structure filler 2. The filler 2 is formed into a tubular structure having a lattice-like horizontal section, and through this tubular structure filler 2, the exhaust gas 6 can flow upward from the bottom of the apparatus body 1 and the fed $CO_2$ absorbing liquid can also flow downward from the liquid dispersing nozzle 4. The inside walls of the tubular portions constitute absorbing surfaces (gas-liquid contact surfaces) on which the combustion exhaust gas 6 is reacted with the $CO_2$ absorbing liquid.

The filler 2 is constituted of porcelaneous tubular structures 2' having one lattice side length De of, for example, 15 mm which are laterally arranged as shown by reference numerals $2_1$, $2_2$, $2_3$, $2_4$ . . . in FIG. 1. The thus constituted filler 2 has, for example, an area of 300 mm$^2$ and a length of 500 mm. The fillers 2 are vertically arranged in the form of, for example, 20 stages in the apparatus body 1.

According to the fillers 2 comprising the above-mentioned tubular structures, the gas flows in parallel with the absorbing surfaces, and expansion, contraction and collision of the gas flow and an eddy scarcely occur in a gas path, so that pressure loss due to these factors can be sufficiently inhibited.

The shape of the tubular structure 2' is not restricted to the lattice in FIG. 2, and for example, hexagon, rectangle, triangle and U shape are usable, as long as they form the gas parallel flow. Moreover, with regard to a material for the tubular structure 2', a porcelain, a metal, a ceramic fiber such as silica fiber and a plastic such as polyethylene are usable, so long as they are not corroded or swelled by the $CO_2$ absorbing liquid. As for a manufacturing method, the structure shown in FIG. 2 can usually be manufactured by an extrusion molding method, but a combination of a flat plate and a molding plate or a corrugate machine molding method is also applicable. Anyway, an economical manufacturing method can be selected in accordance with the shape and material.

A feature of the present invention is that the absorbing surfaces, i.e., the gas-liquid contact surfaces of the tubular structures 2' are treated in a rough state so as to have a center line average height of 50 μm or more. The rough-surface treatment is carried out by sandblasting, depending upon a material of the tubular structures. That is, the roughness of the absorbing surface is increased by blowing sand on the absorbing surfaces. This roughness can be adjusted by changing a grain diameter of the sand and a blowing time instead of the sand, it is also possible to use particles of a plastic, silicon or a metal, depending upon the material of the absorbing surfaces. Alternatively, instead of blowing the sand to the absorbing surfaces, it is also possible to apply a coating material including the sand to the absorbing surfaces, depending upon the gas to be treated and the liquid. The above-mentioned center line average height is preferably in the range of from 50 to 100 μm. The rough surface treatment may be achieved by a chemical treatment, depending upon the material of the absorbing surfaces. When using, for example, stainless steel as the material of the tubular structures 2', $FeCl_3$, HCl or HCl+$H_2O_2$ can be used as chemicals for the chemical treatment.

The absorbing surfaces are corroded with these chemicals to become properly rough. A degree of the corrosion is determined by a chemical concentration×a dipping time×a temperature. Table 1 shows chemical treatment conditions, treatment results and evaluations.

TABLE 1

Figure 3:
FIG. 3 is an illustrative view of the rough surface of the tubular structure for use in the first embodiment of the present invention.
Figure 4:
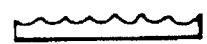
FIG. 4 is an illustrative view of the rough surface of the other tubular structure for use in the first embodiment of the present invention.
Figure 5:
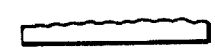
FIG. 5 is an illustrative view of the rough surface of the still other tubular structure for use in the first embodiment of the present invention.

| Chemicals | Conc., Temp. and Time | Surface | Evaluation |
|---|---|---|---|
| $FeCl_3$ | 30% - 40–60° C. - 2–10 min | See FIG. 3 | Δ |
| HCl | 30% - 40–60° C. - 5–10 min | See FIG. 4 | o |
| HCl + $H_2O_2$ | 35 + 1% - 100° C.* - 1 min or less | See FIG. 5 | Δ |

*The temperature was raised to 100° C. by heat generation.

When the absorbing surfaces were treated with 30% $FeCl_3$ at a temperature of 40°–60° C. for 2–10 minutes, holes 2a and pitchings 2b were formed on the absorbing surfaces, so that the surfaces were considerably rough, as shown in FIG. 3. Next, when the absorbing surfaces were treated with 35% HCl at a temperature of 20°–40° C. for 5–10 minutes, the absorbing surfaces were properly rough, as shown in FIG. 4. Moreover, when 1% $H_2O_2$ was added to 35% HCl to generate heat and the absorbing surfaces were treated for 1 minute or less at a raised temperature of 100° C., the absorbing surfaces were not so rough, as shown in FIG. 5. From these results, it is apparent that the treatment using HCl is most preferable.

Figure 6:
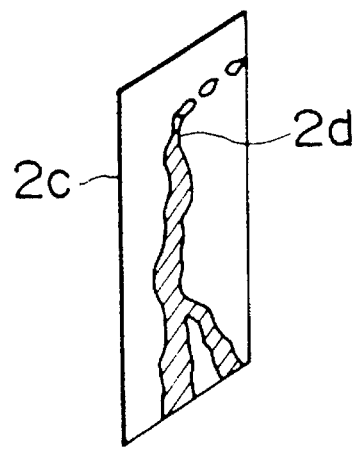
FIG. 6 is an illustrative view showing the water repellency of a conventional tubular structure.
Figure 7:
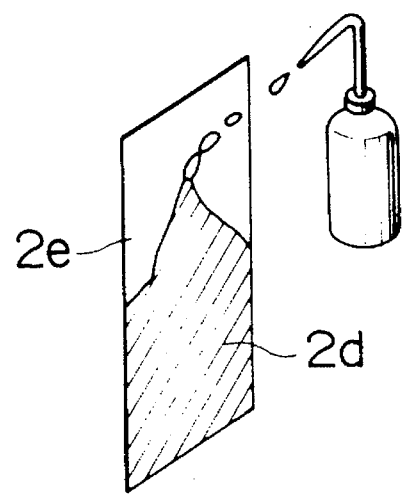
FIG. 7 is an illustrative view of the wettability of an absorbing liquid on the tubular structure in the first embodiment of the present invention.

FIGS. 6 and 7 show a comparison between the effect of the absorbing surface treated with HCl of the above chemicals and that of a conventional absorbing surface. FIG. 6 shows a state of the absorbing surface in the case that the $CO_2$ absorbing liquid comprising an aqueous monoethanolamine solution was sprayed on a mirror finished surface (center line average height=1 μm) plate 2c of stainless steel (JIS indication: SUS304; austenite) and then allowed to flow downward. In this case, it was impossible to increase a gas-liquid contact area, because the absorbing liquid 2d was repelled to flow in the form of a string on the absorbing surface. On the contrary, when the absorbing surface of the stainless steel plate was roughly formed in the abovementioned manner, the absorbing liquid 2d expanded on the roughly formed absorbing surface 2e, whereby the gas-liquid contact area could be increased, as shown in FIG. 7.

Figure 8:
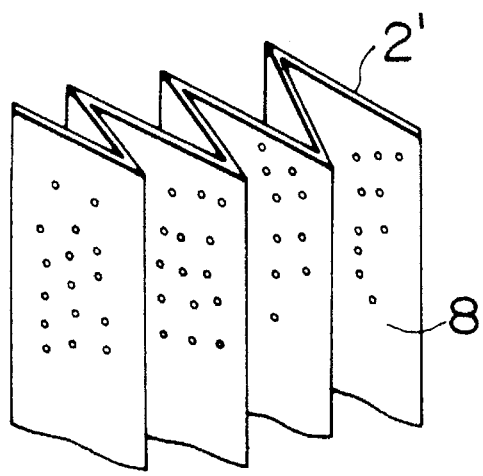
FIG. 8 is an illustrative view of the other tubular structure for use in the first embodiment of the present invention.

Next, another embodiment of the present invention will be described. In this embodiment, the tubular structure 2' is constituted of a porous plate 8 provided with a large number of small holes, as shown in FIG. 8. A rate of the hole area of the porous plate 8 is preferably 20% or less. The tubular structure 2' may be formed in the shape of a lattice in its horizontal section as described above, or it may be formed in the shape of hexagon, rectangle, triangle or U shape. FIG. 8 shows an embodiment in which the horizontal section is formed into a triangular wavy shape. According to this embodiment, the absorbing liquid easily remains in the small holes of the porous plate to prolong a retention time. Therefore, the absorbing liquid can be prevented from flowing on the absorbing surface in the form of a string to increase the gas-liquid contact area. In consequence, it is possible to improve the $CO_2$ absorbing efficiency.

Figure 9:
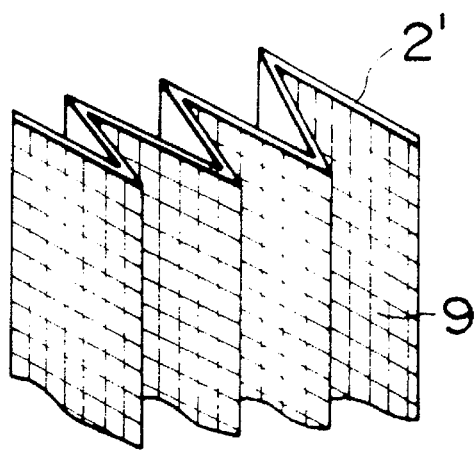
FIG. 9 is an illustrative view of the still other tubular structure for use in the first embodiment of the present invention.

Next, still another embodiment of the present invention will be described. In this embodiment, the tubular structure 2' is constituted of a mesh 9 comprising a wire mesh, as shown in FIG. 9. According to this embodiment, the absorbing liquid can reside in the mesh of the mesh for a long time owing to surface tension or cohesive force, and the diffusion of the absorbing liquid can be easily achieved on the absorbing surface. Therefore, this embodiment also makes it possible to increase the gas-liquid contact area and to improve the $CO_2$ absorbing efficiency. Even if the mesh of a plastic or another material is used instead of the wire mesh, a similar effect can be obtained. No particular restriction is put on a weaving manner of the mesh, and plain weave, twill weave or the like be employed. The mesh may be disposed so that the wires of the mesh may have a suitable angle to the ground. The size of the mesh to be selected is preferably 3 mesh or more, more preferably 8 mesh or more.

Second Embodiment

As the second embodiment of the apparatus for gas-liquid contact of the present invention, a $CO_2$ gas absorption device for removing $CO_2$ from a combustion exhaust gas by bringing the combustion exhaust gas containing $CO_2$ into contact with a $CO_2$ absorbing liquid will be described in reference to drawings (FIGS. 1, 2, and 10 to 12).

The description of FIGS. 1 and 2 has been made in the above-mentioned first embodiment, and so it will be omitted.

Figure 10:
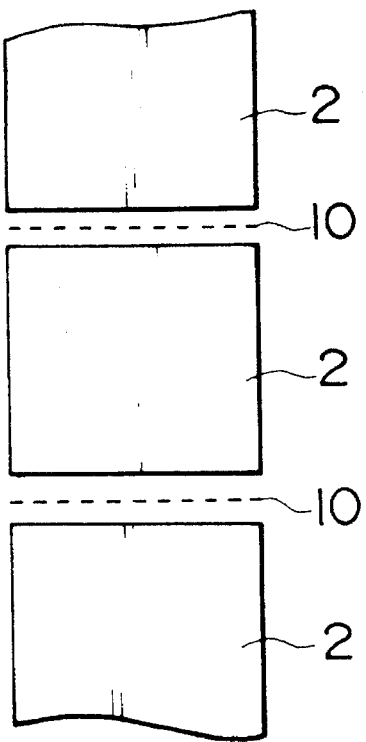
FIG. 10 is a constitutional view of the second embodiment of the present invention in which a dispersing plate is interposed between the tubular structures.

The present invention is characterized in that a dispersing plate 10 is interposed between tubular structure fillers 2 vertically arranged in the form of many steps, as shown in the cross section of FIG. 10. The dispersing plate 10 is constituted of, for example, a porous plate. A rate of the hole area of the porous plate (a rate of the hole area to the entire area inclusive of the hole area) is preferably 80% or more in order to prevent the increase of pressure loss at the time of the passage of the gas. The shape of the holes of the porous plate is not limited to a circle, and a deformed shape such as a star is also acceptable.

Figure 11:
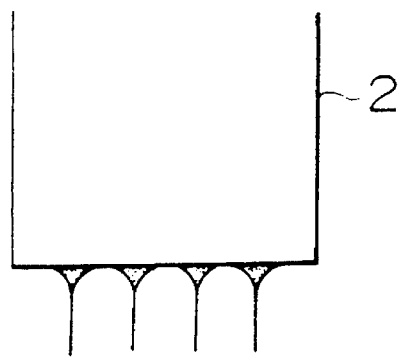
FIG. 11 is an illustrative view of the conventional flow of the absorbing liquid in the case that no dispersing plate is used.

FIG. 11 shows the flow of the absorbing liquid in the case that any dispersing plate is not interposed between the vertically arranged tubular structure fillers 2, 2. In this case, the absorbing liquid flows downward from the lowermost surface of the filler 2 in the form of strings, so that the dispersibility of the liquid is impaired. In particular, if a space between the fillers 2, 2 is 5 mm or more, the absorbing liquid drips in the form of the strings, and in consequence, the dispersibility is easily impaired.

Figure 12:
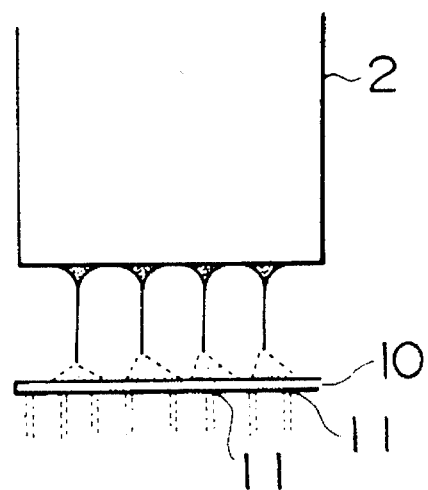
FIG. 12 is an illustrative view of the flow of the absorbing liquid in the case that a dispersing plate is provided in the second embodiment of the present invention.

On the contrary, FIG. 12 shows a case where the dispersing plate 10 is interposed between the fillers 2, 2. The absorbing liquid flowing downward from the lowermost surface of the upper filler 2 hits against the dispersing plate 10 and is then dispersed thereon again by the dispersing plate 10. Therefore, a gas-liquid contact area can be increased on the absorbing surfaces of the filler 2, so that a $CO_2$ absorbing efficiency can be improved. When the holes of the porous plate are formed in the shape of a star, the disturbance of the passage of the gas through the holes 11 can be prevented by the passage of the absorbing liquid through the holes 11.

As another embodiment of the present invention, the dispersing plate 10 may be constituted of a wire mesh. Even in this embodiment, about the same effect as in the preceding embodiment can be obtained. In this case, the passage of the gas through the mesh is scarcely prevented by the passage of the absorbing liquid through the mesh. Instead of the wire mesh, a mesh of a plastic or the like may be used.

The effectiveness of the present invention is apparent from the above description, but the dispersibility of the absorbing liquid flowing from the top was observed at ordinary temperature and atmospheric pressure by the use of a 30% aqueous monoethanolamine solution as the $CO_2$ absorbing liquid, the porcelaneous tubular structures having an area of 300 $mm^2$, a length of 500 mm and De of 15 mm, and a wire mesh as the dispersing plate. As a result, it could be confirmed that the absorbing liquid fed to the upper tubular structures was substantially uniformly dispersed at the exit of the lower tubular structures and then flowed downward, in the case that the wire mesh was interposed between the two tubular structures and these tubular structures were then uprightly assembled. In consequence, it can be confirmed that the $CO_2$ absorbing efficiency can remarkably be improved by the present invention.

Third Embodiment

As the third embodiment of the apparatus for gas-liquid contact of the present invention, an example which is applied to a $CO_2$ gas absorption device for removing $CO_2$ from a combustion exhaust gas by bringing the combustion exhaust gas containing $CO_2$ into contact with a $CO_2$ absorbing liquid will be described in reference to the drawings (FIGS. 1 and 13 to 19).

The description of FIG. 1 has been made in the above-mentioned first embodiment, and so it will be omitted. In this case, as the horizontal section of tubular structure fillers, any of various shapes can be employed, and needless to say, a single shape or a combination of a plurality of shapes is usable. Moreover, the optional shape in the horizontal section may be a closed or an opened circle.

Figure 13:
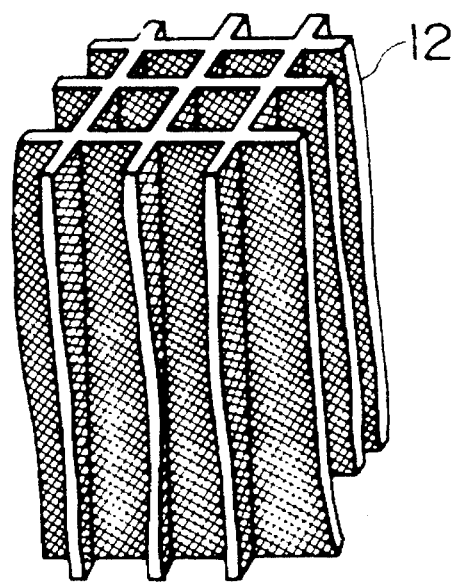
FIG. 13 is a partial perspective view of a filler showing the third embodiment of the present invention which is arranged in the $CO_2$ gas absorption device.
Figure 14:
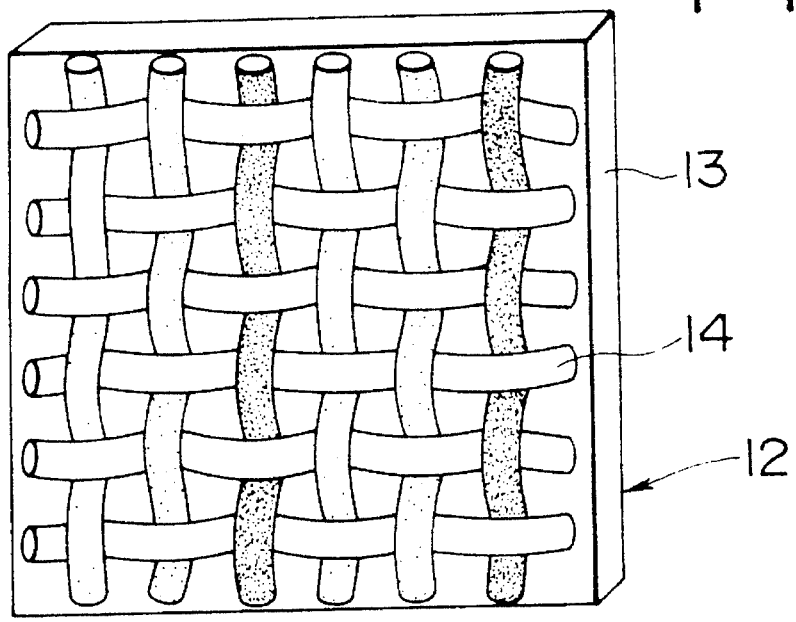
FIG. 14 is an enlarged view of a gas-liquid contact surface formed on the inner wall of the filler in FIG. 13.

The present invention is characterized in that the gas-liquid contact surface formed on the inner wall of each tubular structure filler 12 is constituted of a mesh 14 which adheres to the surface of a plate 13. FIG. 13 is a perspective view showing a part of the tubular structure filler 12 corresponding to the tubular structure filler 2 in FIG. 1, and FIG. 14 shows an enlarged view of the gas-liquid contact surface of the filler 12. In FIG. 14, a weaving manner of the mesh which adheres to the surface of the plate 13 is plain weave, but this weave is not limited and any of various weaves inclusive of twill weave can be used.

No particular restriction is put on a technique for sticking the mesh 14 on the plate 13, and any means such as welding or bonding can be utilized, as long as the mesh 14 stuck on the tubular structure having an optional shape in the horizontal section by such a technique does not separate from the plate 13 during use. The plate 13 and the body 14 should be made of a material which is not attacked by the gas and the liquid for the gas-liquid contact. For example, a wire mesh, a plastic mesh and a mesh made of another material are usable. The mesh may be disposed so that the wires of the mesh may have a suitable angle to the ground. The size of the mesh to be selected is preferably 3 mesh or more, more preferably 8 mesh or more.

Figure 15:
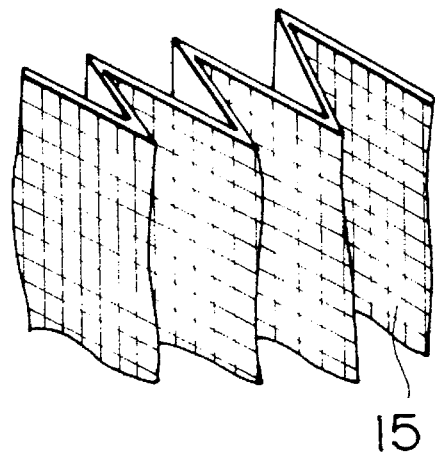
FIG. 15 is an illustrative view showing another embodiment of the filler regarding the third embodiment of the present invention.

FIG. 15 is a perspective view showing another embodiment of the filler 12 of the present invention. In FIG. 15, a strip-like filler 15 formed by zigzagging the plate 13 having the adhered mesh 14 is arranged in the apparatus for gas-liquid contact.

Figure 16:
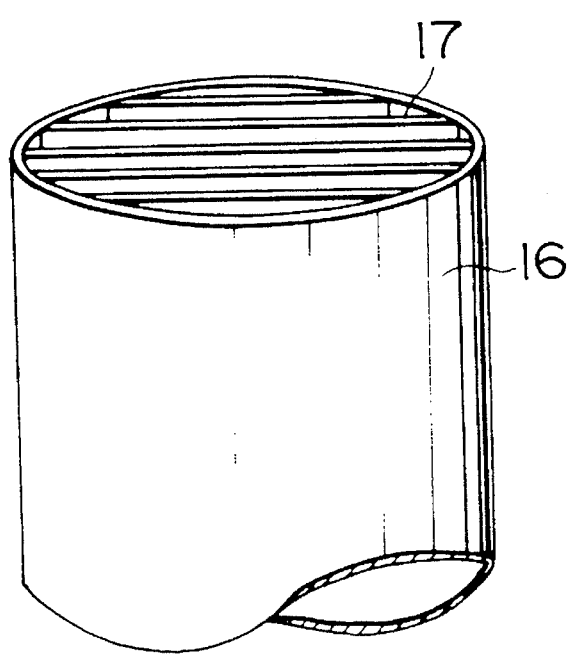
FIG. 16 is an illustrative view showing still another embodiment of the filler regarding the third embodiment of the present invention.

FIG. 16 is a perspective view showing still another embodiment of the above-mentioned filler 12 of the present invention. In this embodiment, fillers 17 comprising plates 13 and meshes 14 stuck on their surfaces are arranged with a certain space therebetween in a barrel 16 of a cylindrical $CO_2$ absorption device so that the gas-liquid contact surfaces of the plates 13 may be parallel with each other. The meshes 14 are stuck on both the sides of each plate 13, and if necessary, a spacer may be inserted between the adjacent plates 13 having the adhered meshes 14. The space between the plates 13 (arrangement density) should be selected so that the absorbing liquids flowing downward along the adjacent plates 13 may not come in contact with each other and so that the flow path resistance of the combustion exhaust gas may not be impaired. In the case of the plate fillers 17 shown in FIG. 16, the absorbing liquid fed from the top attaches to a point of the plate 13, flows downward while horizontally expanded by the mesh 14, and comes in contact with the combustion exhaust gas. Therefore, a contact area increases and the residence time of the downward flowing absorbing liquid also extends, which leads to the remarkable improvement of the gas-liquid contact efficiency.

TEST EXAMPLE, COMPARATIVE EXAMPLE

In order to confirm a gas-liquid contact efficiency in the case that a member obtained by stacking the above-mentioned mesh on the surface of the above-mentioned plate was used on a gas-liquid contact surface, a model test was made, and the performance of a cylindrical inside surface formed with the above-mentioned member was compared with that of another cylindrical inside surface formed with another member.

Figure 17:
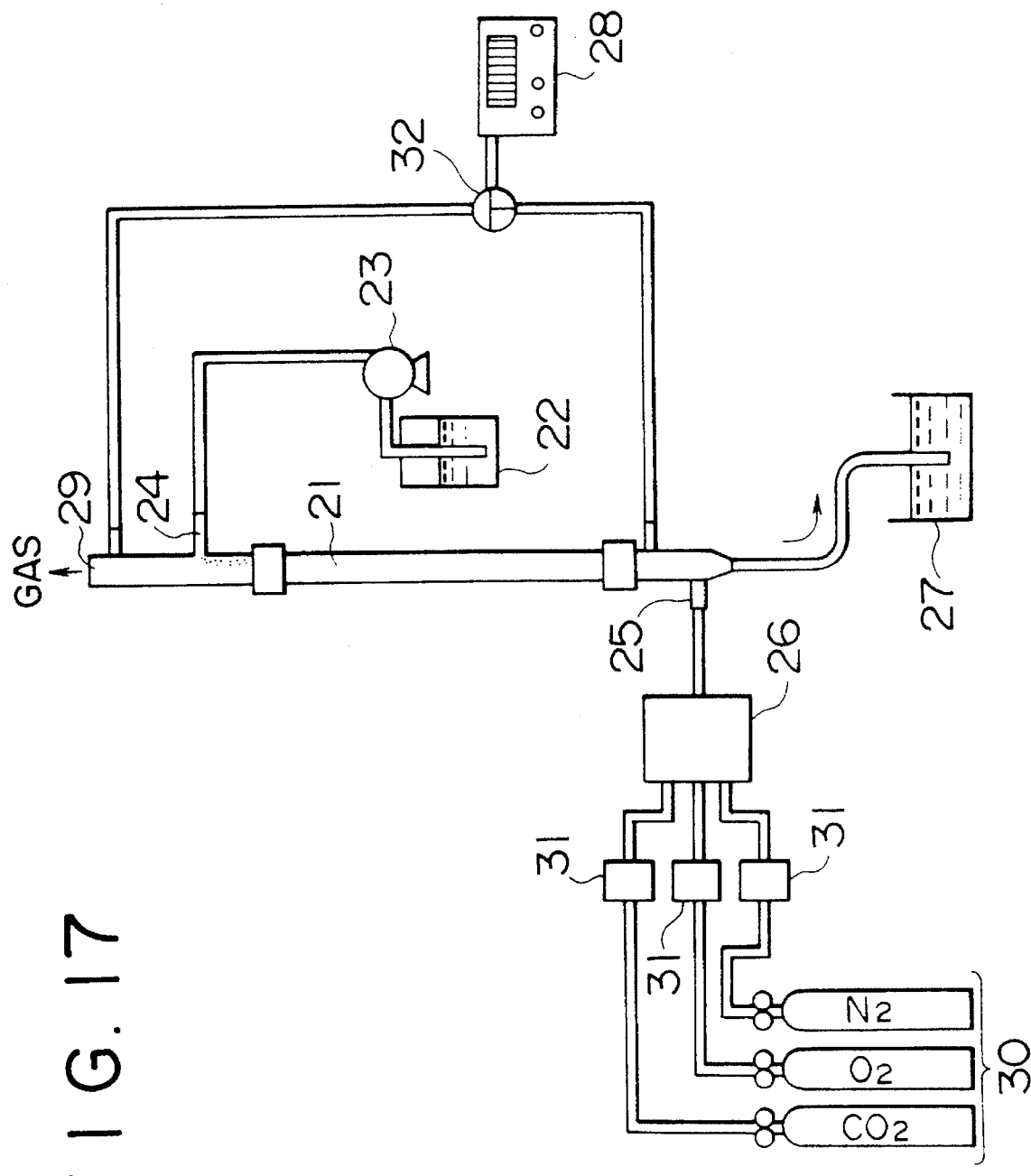
FIG. 17 is an illustrative view of a testing equipment for inspecting an effect of the third embodiment of the apparatus for gas-liquid contact according to the present invention.

FIG. 17 shows a testing equipment which is used herein. In FIG. 17, reference numeral 21 is a vertically disposed stainless steel absorbing tube having a length of 1.15 m and an inside diameter of 18 mm. Three samples are used: a stainless steel tube in which its inside surface is chemically treated by immersing it in a 35% hydrochloric acid solution at a temperature of 30° C. for 10 minutes (Comparative Example 1), a stainless steel tube treated by sandblasting (center line average height=1 μm, Comparative Example 2), and a stainless steel tube to which a 20-mesh wire mesh is attached (Example). Reference numeral 22 is a $CO_2$ absorbing liquid tank containing a 30% aqueous monoethanolamine solution, and this solution is fed to the top of the absorbing tube 21 through an absorbing liquid inlet 24 by means of a metering pump 23. The absorbing liquid is fed to one point on the inner surface of the absorbing tube 21 at a flow rate of 4 liters/hour, and at the time of the downward flow, an expansion degree of the absorbing liquid varies with the members of the inner surfaces. The absorbing liquid which has flowed downward in contact with a test gas is led to a liquid reservoir 27. On the other hand, the test gas having a $CO_2$ concentration of 9.7–9.8 vol % (nitrogen concentration=90.2–90.3 vol %) is fed at a flow rate of 2 m³/hour to the absorbing tube 21 through a gas inlet 25 provided at a lower portion of the absorbing tube 21. A $CO_2$ concentration of the test gas is analyzed in the vicinity of the gas inlet 25 of the absorbing tube 21 by a $CO_2$ continuous analyzer 28, and the test gas is then brought into contact with the $CO_2$ absorbing liquid during rising through the absorbing tube 21. After the $CO_2$ concentration of the test gas has been similarly analyzed again in front of a gas outlet 29, the test gas is discharged from the system. Every test was made at room temperature (25° C.).

Reference numerals 30, 30, 30 are three gas cylinders filled with a $CO_2$ gas, a nitrogen gas, and an oxygen gas, respectively. Numeral 31 is a gas flow rate controller, and 32 is a switch cock.

Figure 18:
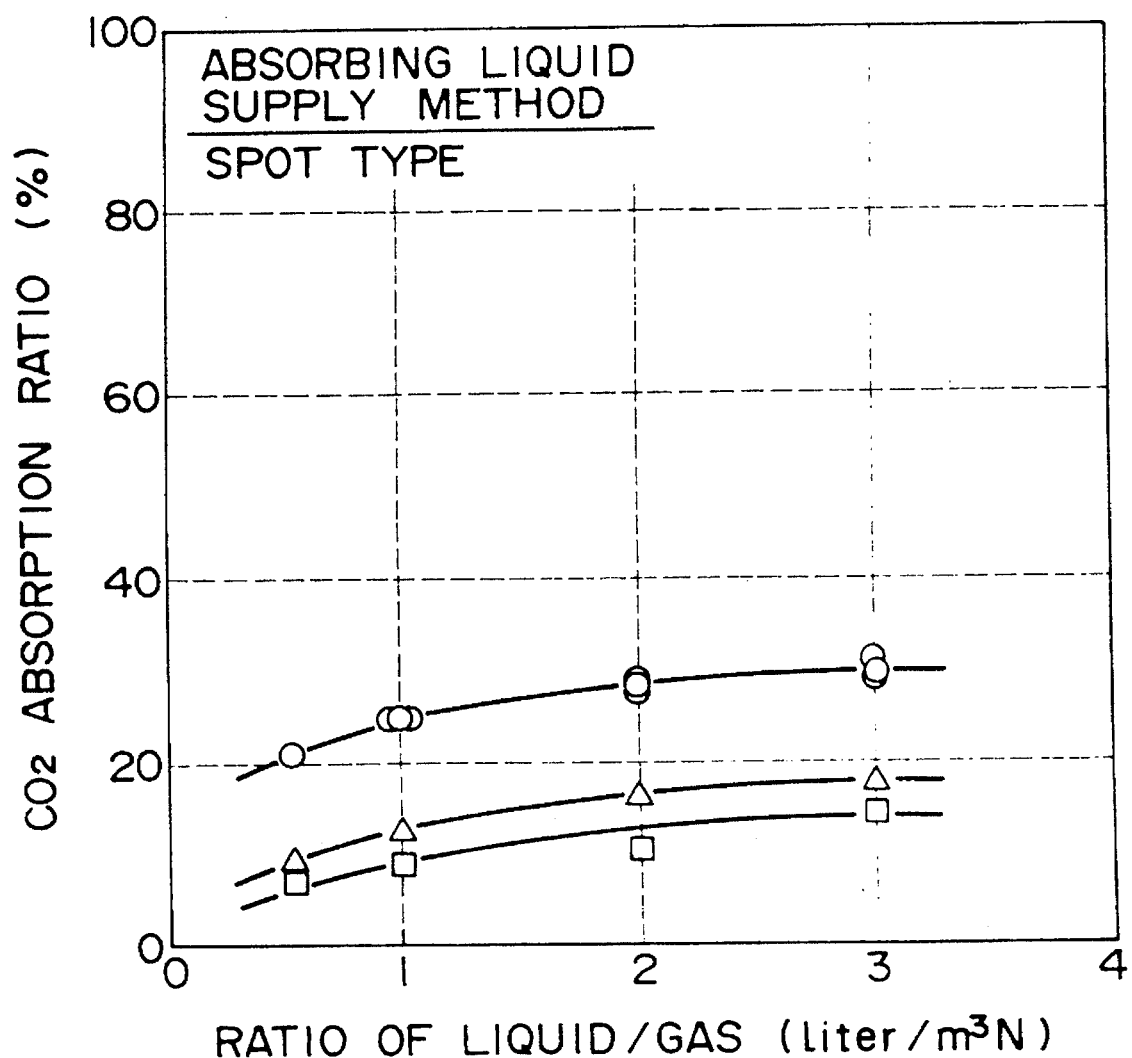
FIG. 18 is a diagram showing test results which elucidate differences of $CO_2$ absorption efficiency due to different materials for the gas-liquid contact surface.
Figure 19:
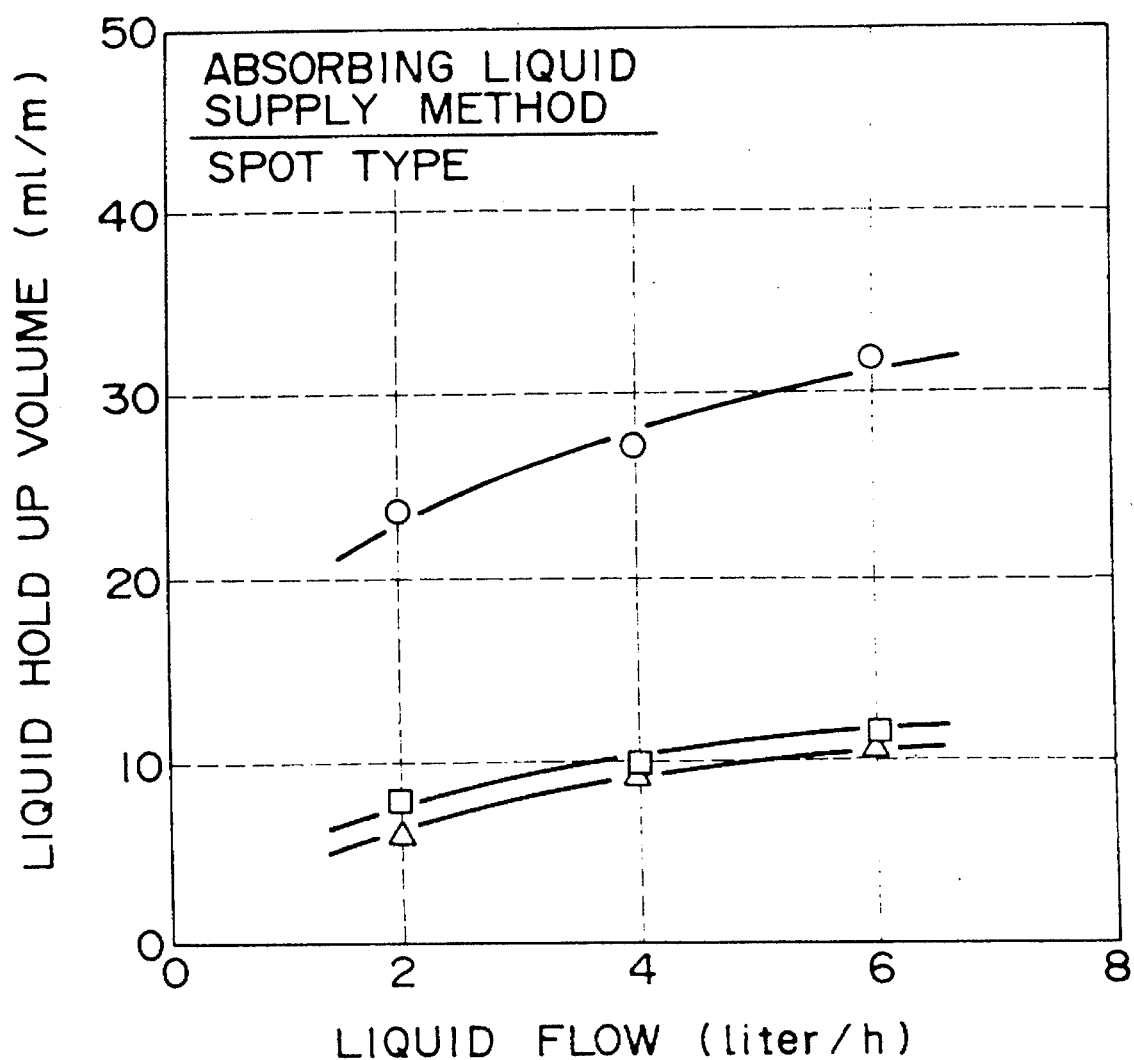
FIG. 19 is a diagram showing test results which elucidate differences of a held liquid volume due to different materials for the gas-liquid contact surface.

The obtained results of this test are shown in FIGS. 18 and 19. FIG. 18 shows relations between a $CO_2$ absorption ratio (%, ordinate) and a liquid/gas ratio L/G (liter/m³N, abscissa) on the basis of the different members for the gas-liquid contact surfaces. Moreover, FIG. 19 shows a liquid hold up volume (ml/m, ordinate) in the case that the respective contact surface members are used.

It is apparent from FIGS. 18 and 19 that the stainless steel absorbing tube provided on the inside surface thereof with the 20-mesh wire mesh is much more excellent in the absorption ratio and the liquid hold up volume than other members, the aforesaid wire mesh being correspond to the member of the present invention comprising the plate and the mesh stuck on the surface thereof. After the test, the inside walls of the absorbing tubes are inspected. As a result, wet ratios are 60% in Comparative Example 1, 26% in Comparative Example 2, and 81% in Example.

Fourth Embodiment

As the fourth embodiment of the apparatus for gas-liquid contact of the present invention, an example which is applied to a $CO_2$ gas absorption device for removing $CO_2$ from a combustion exhaust gas by bringing the combustion exhaust gas containing $CO_2$ into contact with a $CO_2$ absorbing liquid will be described in reference to the drawings (FIGS. 20 to 27).

Figure 20:
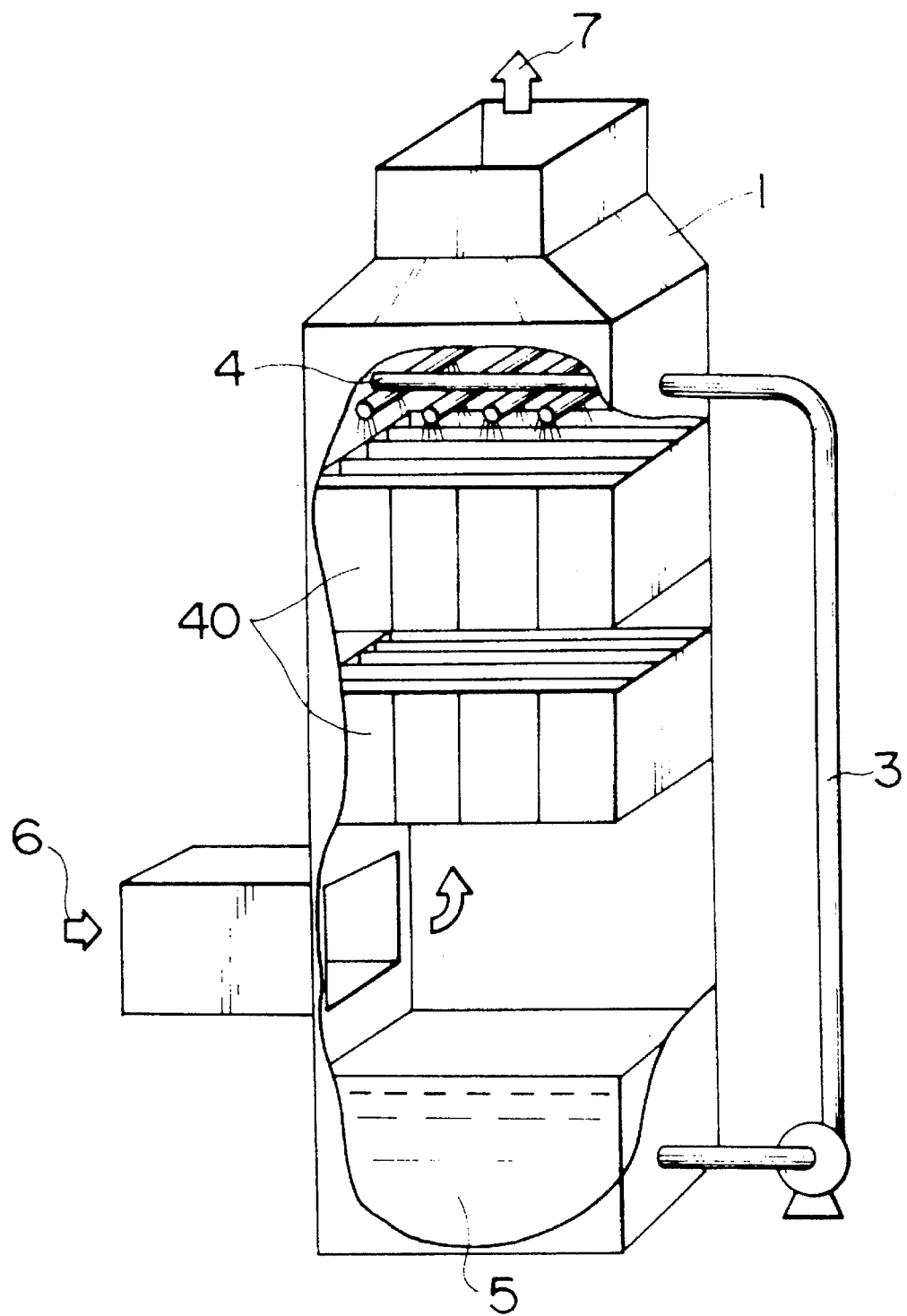
FIG. 20 is a whole perspective view of a $CO_2$ gas absorption device to which an apparatus for gas-liquid contact regarding the fourth embodiment of the present invention is applied.

FIG. 20 shows a $CO_2$ gas absorption device in which tubular structure fillers 40 are arranged instead of the tubular structure fillers 2 in FIG. 1. Other members in FIG. 20 have the same reference numerals as in FIG. 1, and they have already described in the first embodiment and so the description regarding them will be omitted.

Between the plural steps of the fillers 40, a mesh-like member such as a wire mesh may be interposed for the sake of the redispersion of the downward flowing absorbing liquid.

The present invention is characterized in that the horizontal section of the filler has a shape selected from the group consisting of circles (A), circular arcs or continuously combined circular arcs (B) and straight lines (C) which neither mutually intersect nor contact. In general, the horizontal section of the filler comprises only one of these shapes, but it may comprise two or more thereof. In FIG. 20, the shape of the horizontal section of the tubular structure filler 40 is one of the shapes usable in the present invention, and this shape comprises the group of the straight lines which neither mutually intersect nor contact, particularly it comprises parallel lines in this example. In this case, the tubular structure is constituted of a plurality of vertically arranged plates, as apparently shown in FIG. 20. The arrangement density of these plates should be selected so that the absorbing liquids flowing downward along the vertically or horizontally adjacent plates 13 may not come in contact with each other and so that the flow path resistance of the combustion exhaust gas may not be impaired. Preferably, the plates are arranged at a higher density in consideration of these requirements. This arrangement density may be adjusted by interposing a spacer between the adjacent plates.

Figure 21:
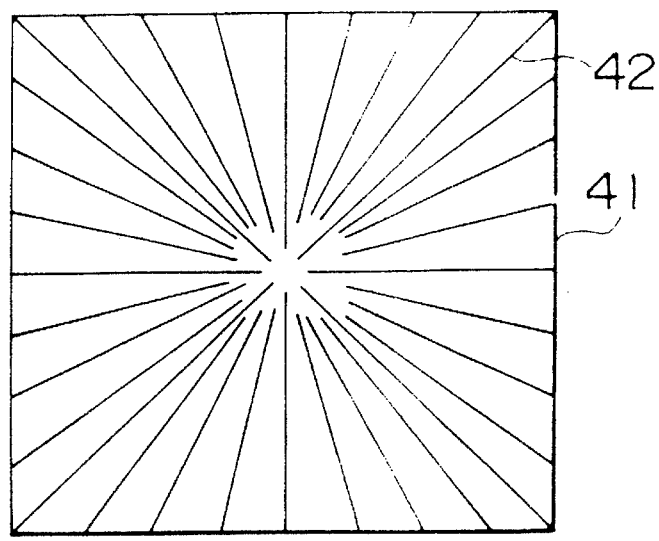
FIG. 21 is an illustrative view of the horizontal section of the tubular structure having straight lines which do not mutually intersect or contact in the fourth embodiment of the present invention.
Figure 22:
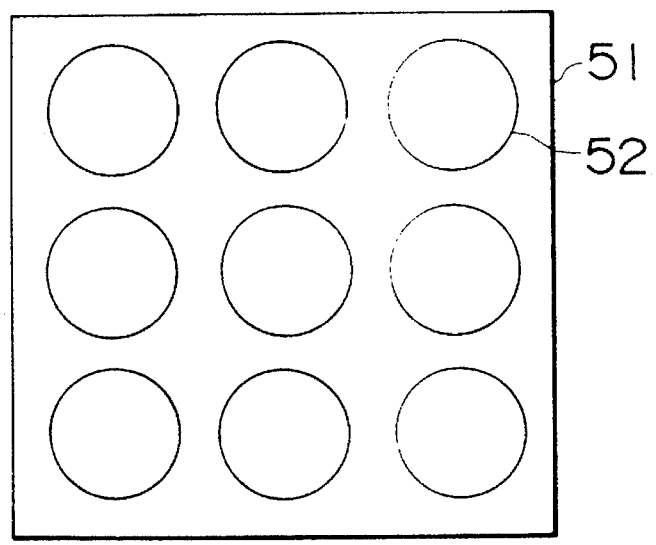
FIG. 22 is an illustrative view of the horizontal section of the tubular structure having circles in the fourth embodiment of the present invention.
Figure 23:
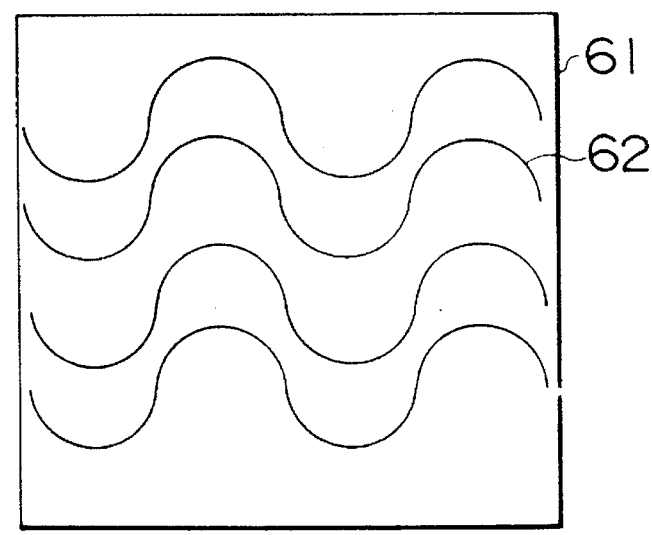
FIG. 23 is an illustrative view of the horizontal section of the tubular structure having connected semi-circular arcs in the fourth embodiment of the present invention.
Figure 24:
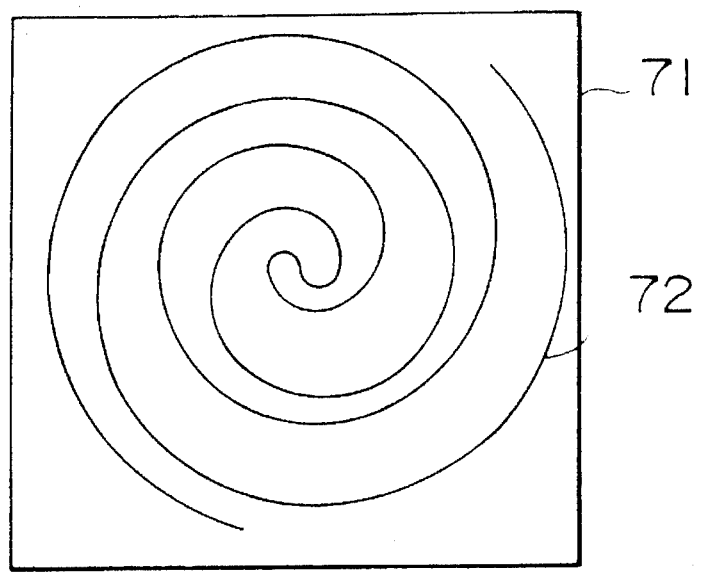
FIG. 24 is an illustrative view of the horizontal section of the tubular structure having spirals in the fourth embodiment of the present invention.

FIG. 21 shows another example of the filler, i.e., a linear filler 42 in which the shape of a horizontal section comprises straight lines which neither mutually intersect nor contact; FIG. 22 shows a circular filler 52; FIG. 23 shows a continuous semicircular arc filler 62; and FIG. 24 shows a spiral filler 72 which seems to be continuously combined circular arcs having a gradually increasing (or decreasing) radius. The continuous combination of the circular arcs additionally includes a smoothly formed free curve. However, a shape in which another circular arc is combined with the circular arc at a point is excluded from the category of the continuous combination regarding the present invention. Incidentally, each of reference numerals 41, 51, 61 and 71 in FIGS. 21, 22, 23 and 24 is a $CO_2$ absorption device.

When the filler having the shape of this example is used, the absorbing liquid fed from the top does not get together at a certain position to flow downward in the form of a string, but tends to expand in the horizontal direction of the inner wall, when it flows downward along the inner wall (the gas-liquid contact surface) of the tubular structure. In consequence, a gas-liquid contact efficiency is remarkably improved.

Figure 25:
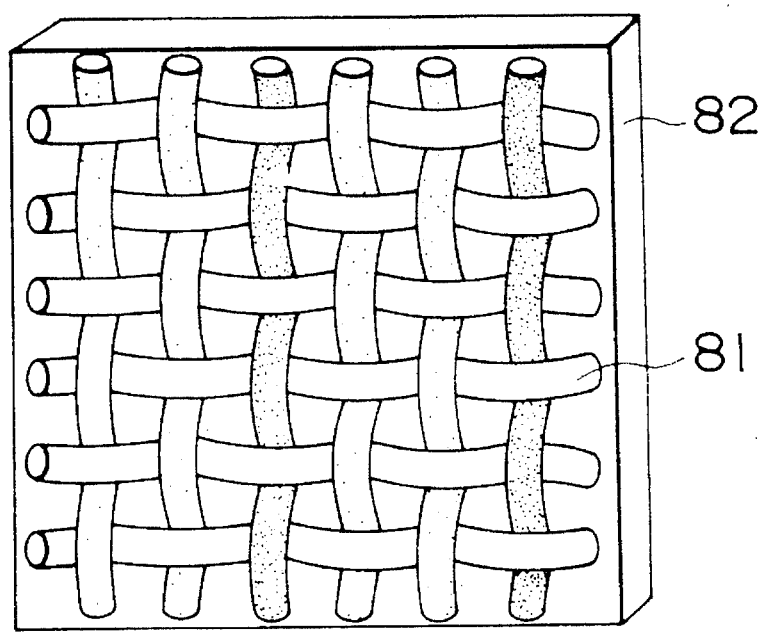
FIG. 25 is an illustrative view of the tubular structure comprising a plate and a mesh which adheres to the plate in the fourth embodiment of the present invention.

In this example, no particular restriction is put on the material of the gas-liquid contact surface, and examples of the usable material include a mirror-finished material, a material roughed by a chemical treatment or a blasting treatment and a filler material to which a mesh adheres. Among these materials, the filler material having the adhered mesh is preferable. FIG. 25 shows an enlarged view of the gas-liquid contact surface of such a filler material. In FIG. 25, a weaving manner of the mesh 81 is plain weave, but this weave is not limited and any of various weaves inclusive of twill weave can be used. No particular restriction is put on a technique for sticking the mesh 81 on the plate 82, and any means such as welding or bonding can be utilized, as long as the mesh 14 stuck on the tubular structure having an optional shape in the horizontal section by such a technique does not separate from the plate during use. As the mesh, for example, a wire mesh, a plastic mesh and a mesh made of another material are usable. The mesh may be disposed so that the wires of the mesh may have a suitable angle to the ground. The size of the mesh to be selected is preferably 3 mesh or more, more preferably 8 mesh or more.

As the filler material of this example, there can be employed a material which is not attacked by the gas and the liquid for the gas-liquid contact.

TEST EXAMPLE, COMPARATIVE EXAMPLES 1, 2

In order to confirm a gas-liquid contact efficiency in the case that a filler having a horizontal section shape of this embodiment was used, a $CO_2$ absorbing test was made, as the simplest case, using a circular absorbing tube (Example), a triangular absorbing tube (Comparative Example 1), and a quadrangular absorbing tube (Comparative Example 2) which were the barrels of absorption devices having an inside diameter of 15 mm and which were made of a transparent acrylic resin. These tubes having the respective shapes were designed so that the total areas of their inside walls might be equal to each other.

Figure 26:
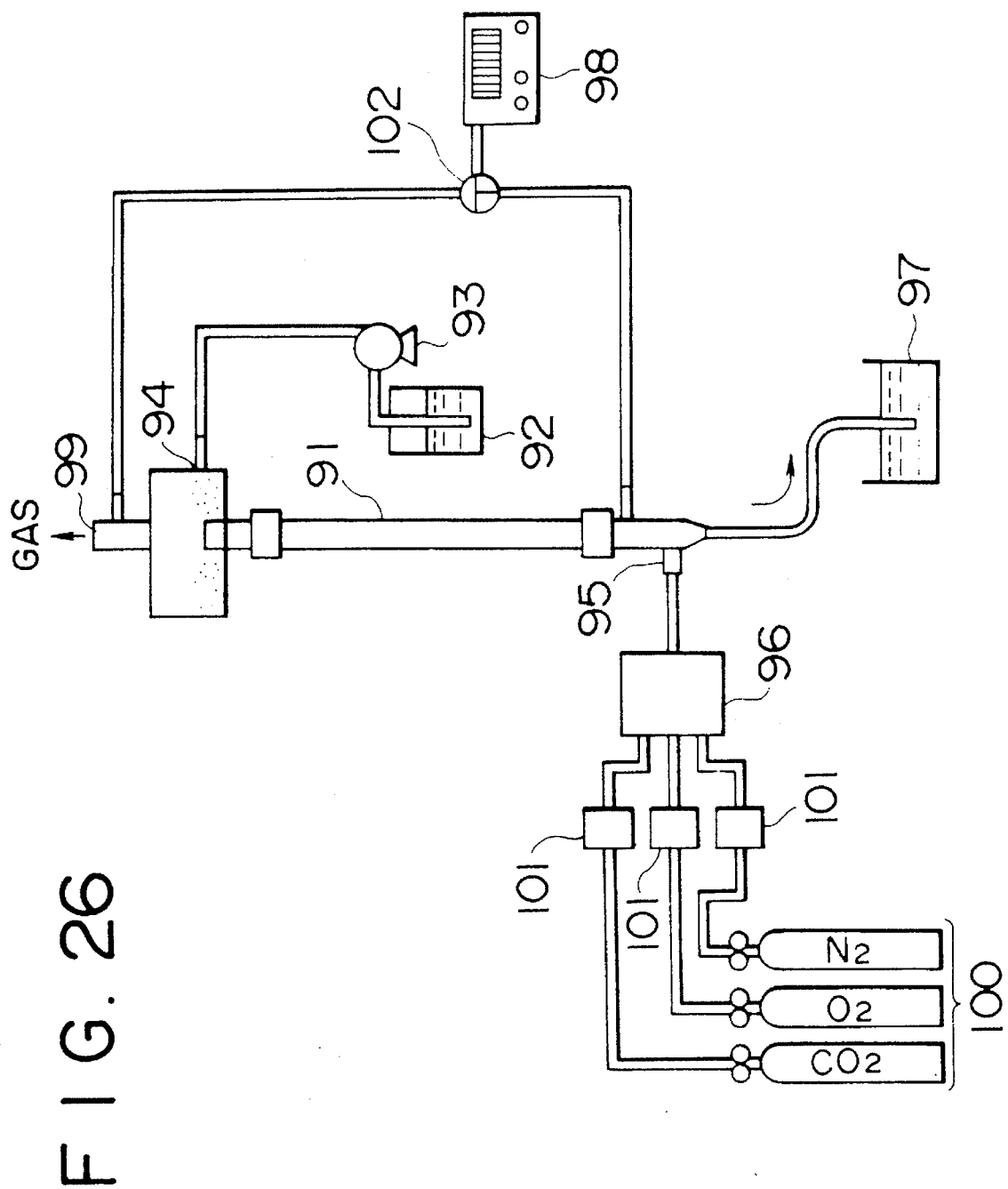
FIG. 26 is an illustrative view of a testing equipment for inspecting an effect of the fourth embodiment of the apparatus for gas-liquid contact of the present invention.

FIG. 26 shows a testing equipment which is used herein. In FIG. 26, reference numeral 91 is a vertically disposed absorbing tube having a length of 1.15 m. Numeral 92 is a $CO_2$ absorbing liquid tank containing a 30% aqueous monoethanolamine solution, and the $CO_2$ absorbing liquid is fed to the top of the absorbing tube 91 through an absorbing liquid inlet 94 by means of a metering pump 93. The absorbing liquid is constantly fed to the inner wall of the absorbing tube at a flow rate of 4 liters/hour by overflow, as shown in this drawing. At the time of the downward flow, an expansion degree of the absorbing liquid, a wet degree of the inside walls and a $CO_2$ absorbing efficiency vary with the shapes of the above-mentioned absorbing tubes 91. The absorbing liquid which has flowed downward in contact with a test gas is led to a liquid reservoir 97. On the other hand, the test gas having a $CO_2$ concentration of 9.7–9.8 vol % (nitrogen concentration=90.2–90.3 vol %) is fed at a flow rate of 2 m³/hour to the absorbing tube 91 through a gas inlet 95 provided at a lower portion of the absorbing tube 91. A $CO_2$ concentration of the test gas is analyzed in the vicinity of the gas inlet 95 of the absorbing tube 91 by a $CO_2$ continuous analyzer 98, and the test gas is then brought into contact with the $CO_2$ absorbing liquid during rising through the absorbing tube. After the $CO_2$ concentration of the test gas has been similarly analyzed again in front of a gas outlet 99, the test gas is discharged from the system. Every test was made at room temperature (25° C.).

Reference numerals 100, 100, 100 are three gas cylinders filled with a $CO_2$ gas, a nitrogen gas, and an oxygen gas, respectively. Numeral 101 is a gas flow rate controller, and 102 is a switch cock.

Figure 27:
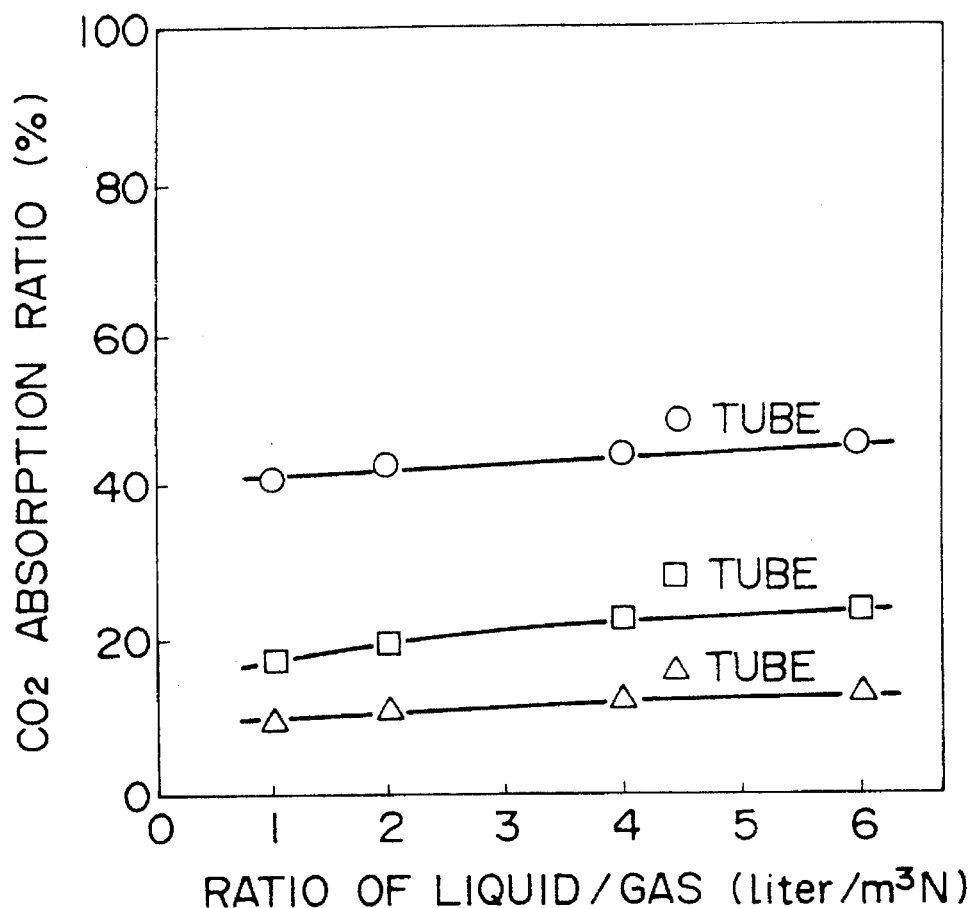
FIG. 27 is a diagram showing test results which elucidate differences of $CO_2$ absorbing efficiency in the case that absorbing tubes having different shapes of the horizontal section are used.
Figure 28:
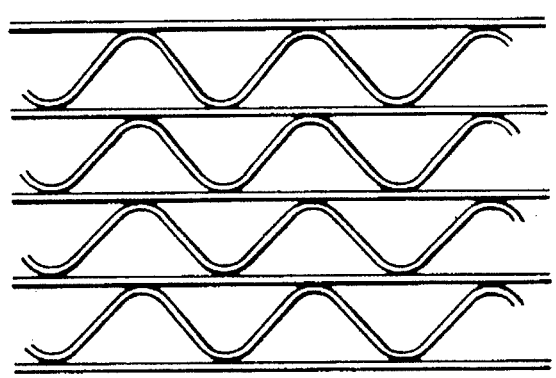
FIG. 28 is an illustrative view of the shape of the horizontal section of the other tubular structure filler for use in the $CO_2$ gas absorption device in FIG. 1.

The obtained results of this test are shown in FIG. 27. FIG. 27 shows relations between a $CO_2$ absorption ratio (%, ordinate) and a liquid/gas ratio L/G (liter/m³N, abscissa) on the basis of the different shapes for the gas-liquid contact surfaces.

As is apparent from FIG. 27, when the circular absorbing tube having the filler horizontal section shape of this embodiment is used, a $CO_2$ absorption ratio is much more excellent than in the cases of the quadrangular tube and the triangular tube. Moreover, during the absorbing test, a downward flow state of the absorbing liquid was observed. As a result, it was apparent that the inner wall of the circular absorbing tube was entirely wetted with the absorbing liquid and a wet rate was 100%. On the contrary, in the quadrangular tube and the triangular tube, the absorbing liquid tended to get together and flow only at corners and the wet rates of the both tubes were about 20%.

We claim:

1. A carbon dioxide absorbing device comprising a main cylindrical body and tubular structure fillers contained in said cylindrical body having a plurality of substantially parallel, vertically arranged, flat plates, spaced from one another arranged in a substantially vertical direction so that the gas-liquid contact surfaces of the plates are parallel with the flow of the gas and with one another, whereby the gas is brought into contact with the liquid by feeding the liquid from a site above the fillers, allowing the liquid to flow downward along the plates, and feeding the gas from a site under the fillers, and a film forming mesh is adhered to the liquid contact surfaces of said plates.

2. The apparatus for gas-liquid contact according to claim 1 wherein the gas is a combustion exhaust gas and the liquid is a $CO_2$ absorbing liquid so that $CO_2$ gas contained in said combustion exhaust gas is brought into contact with said $CO_2$ absorbing liquid, thereby removing said $CO_2$ gas.

3. An apparatus for gas-liquid contact comprising tubular structure fillers having straight tubular portions, said tubular structure fillers arranged in a substantially vertical direction in the form of plural stages so that the gas-liquid contact surfaces of the fillers may be parallel with the flow of the gas, whereby the gas is brought into contact with the liquid by feeding the liquid from a site above the fillers, allowing the liquid to flow downward along the filler surfaces, and feeding the gas from a site under the fillers, said plural stages of the fillers are separated from each other, and there is interposed, between the stages, a dispersing plate for receiving the liquid flowing downwardly from the upper site of the fillers, dispersing the liquid, and allowing the liquid to flow downwardly, said dispersing plate being porous and having a ratio of hole area to overall surface area of at least about 80%.

4. The apparatus for gas-liquid contact according to claim 3 wherein the dispersing plate has a porous surface portion with a plurality of star-shaped orifices.

5. The apparatus for gas-liquid contact according to claim 3 wherein the gas is a combustion exhaust gas and the liquid is a $CO_2$ absorbing liquid so that $CO_2$ gas contained in said combustion exhaust gas is brought into contact with said $CO_2$ absorbing liquid, thereby removing said $CO_2$ gas.

6. The apparatus for gas-liquid contact according to claim 3 wherein the dispersing plate has a mesh portion.

* * * * *